April 18, 1933.     H. BOUTILLON     1,904,610
AUTOMATIC LIQUID MEASURING AND DELIVERING APPARATUS
Filed Dec. 26, 1929     3 Sheets-Sheet 1

Henri Boutillon
INVENTOR;
By (signature)
his Attorney

April 18, 1933.    H. BOUTILLON    1,904,610
AUTOMATIC LIQUID MEASURING AND DELIVERING APPARATUS
Filed Dec. 26, 1929    3 Sheets-Sheet 2
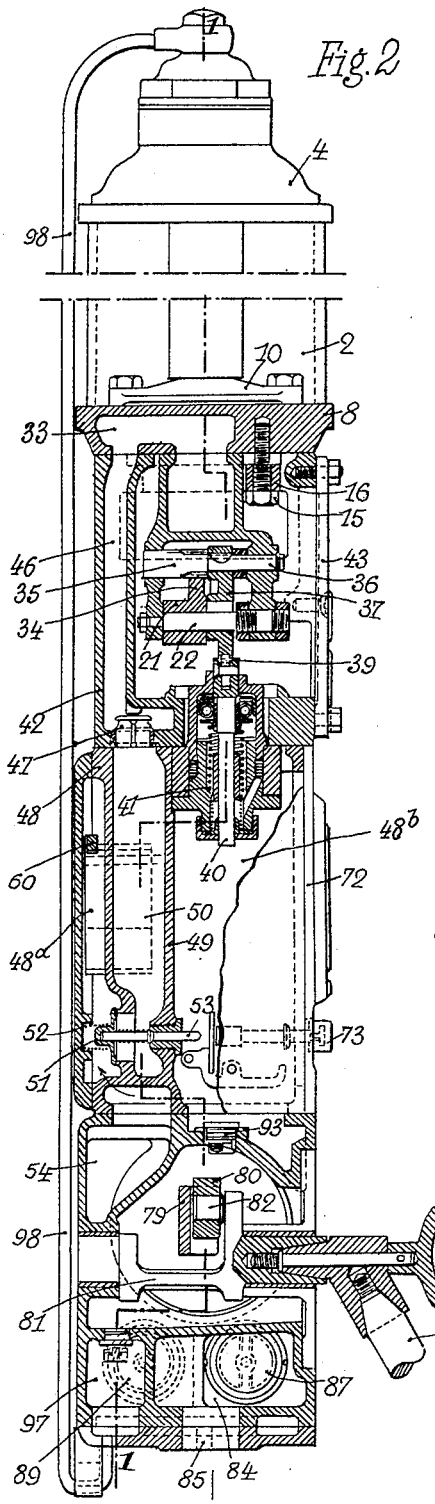
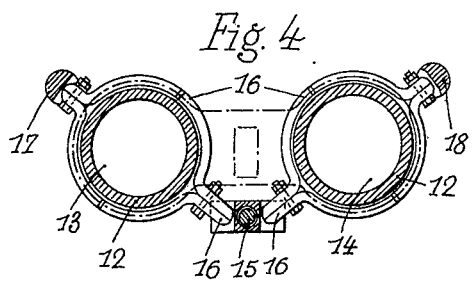
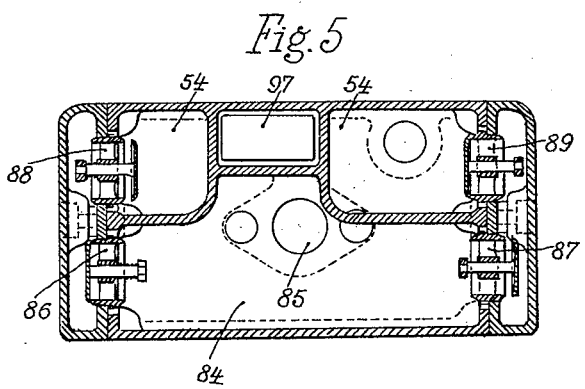
Henri Boutillon
INVENTOR;
his Attorney

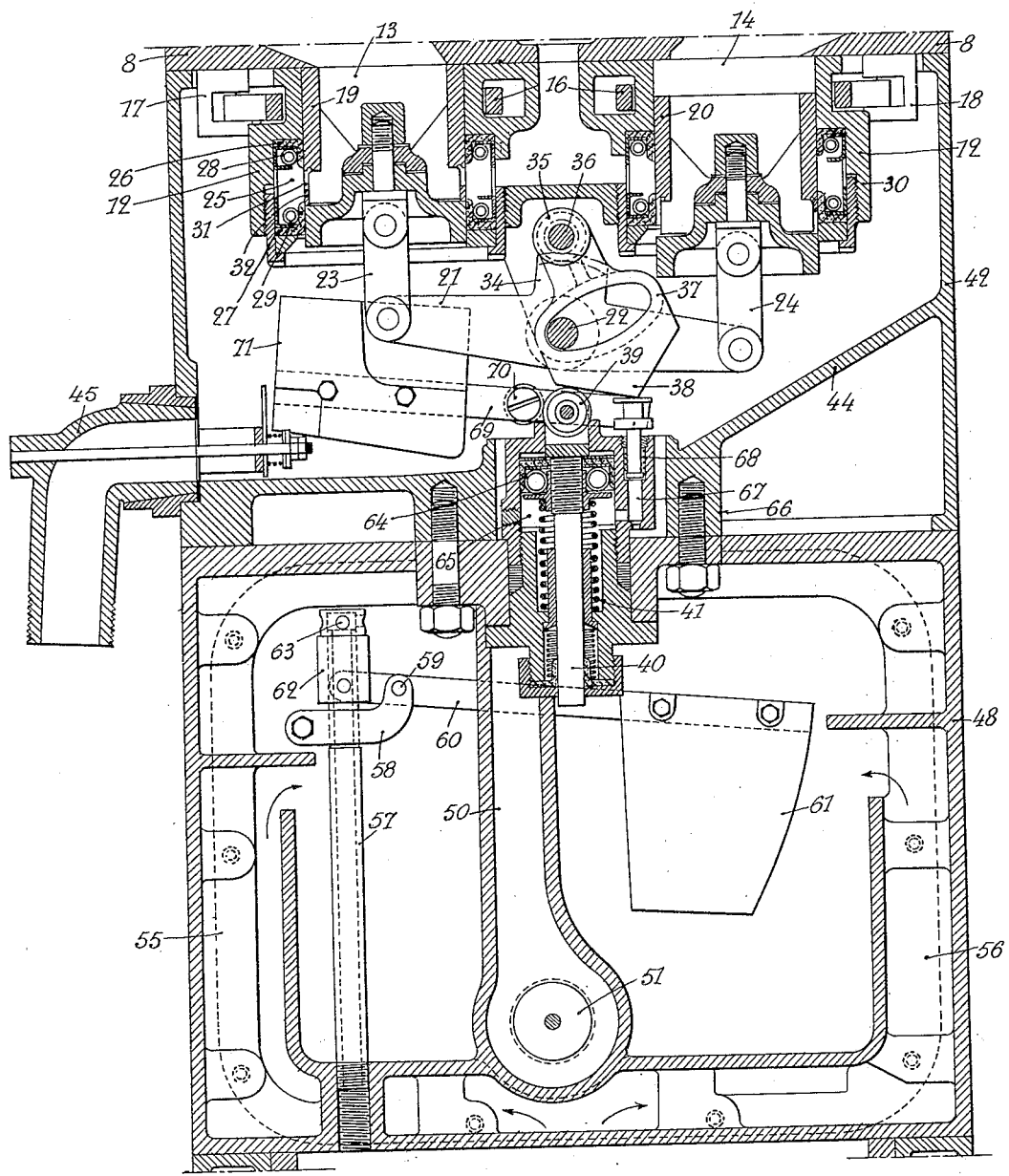

Patented Apr. 18, 1933

1,904,610

UNITED STATES PATENT OFFICE

HENRI BOUTILLON, OF SURESNES, FRANCE

AUTOMATIC LIQUID MEASURING AND DELIVERING APPARATUS

Application filed December 26, 1929, Serial No. 416,375, and in France July 16, 1929.

Automatic apparatus for supplying a measured amount of liquid are in current use, and such apparatus usually comprise two vessels of standard capacity which are connected together and also with inlet and discharge piping by means of a cock or slide valve which is automatically actuated by the liquid in such a manner that one vessel is filled while the other is emptied, and inversely.

The present invention relates to an automatic apparatus for the measured and recorded supply of liquids, in which the several parts are so arranged that the apparatus may be easily constructed, and that it will afford an exact delivery of liquid in spite of all improper operation whether voluntary or involuntary.

According to one feature of the invention, the device for feeding the liquid and for reversing the action of the two measuring vessels consists of a pair of cylindrical slide valves in vertical position, which valves are mounted below the respective vessels and are connected together by a rocking lever in such manner that one valve will rise while the other descends, and inversely, so that the device will pass through the dead centre by the action of the weight of the liquid in the said vessels.

According to another feature of the invention, the apparatus comprises elastic packing members consisting of pressed leather or other material which assure leakless conditions for the said slide valves, and these latter are provided with special devices such as rings or the like by which the edges of the said packing members will be enabled to clear the openings in the valves without entering the same.

The apparatus preferably comprises a hydraulic fastening device which prevents the functioning of the said feeding element when the one of the measuring vessels is not completely emptied.

According to the invention, the said rocking lever connecting the two feeding pistons actuates an auxiliary piston in a cylinder containing liquid which has a single orifice controlled by a needle valve secured to a float situated in the liquid which is being discharged, and this constitutes a fastening device which prevents the functioning of the feeding and reversing device when the measuring vessel is not entirely emptied.

Further characteristics of the invention will be specified in the following description.

In the accompanying drawings, which are given solely by way of example:

Fig. 2 is a section on the line 2—2 of Fig. 1.

Fig. 3 is a view on a larger scale showing the feeding and reversing device represented in Fig. 1.

Fig. 4 is a detail view showing the method of attaching the feeding device, this being a section on the line 4—4 of Fig. 1.

Fig. 5 is a section of the pump according to the line 5—5 of Fig. 1.

Figure 1:
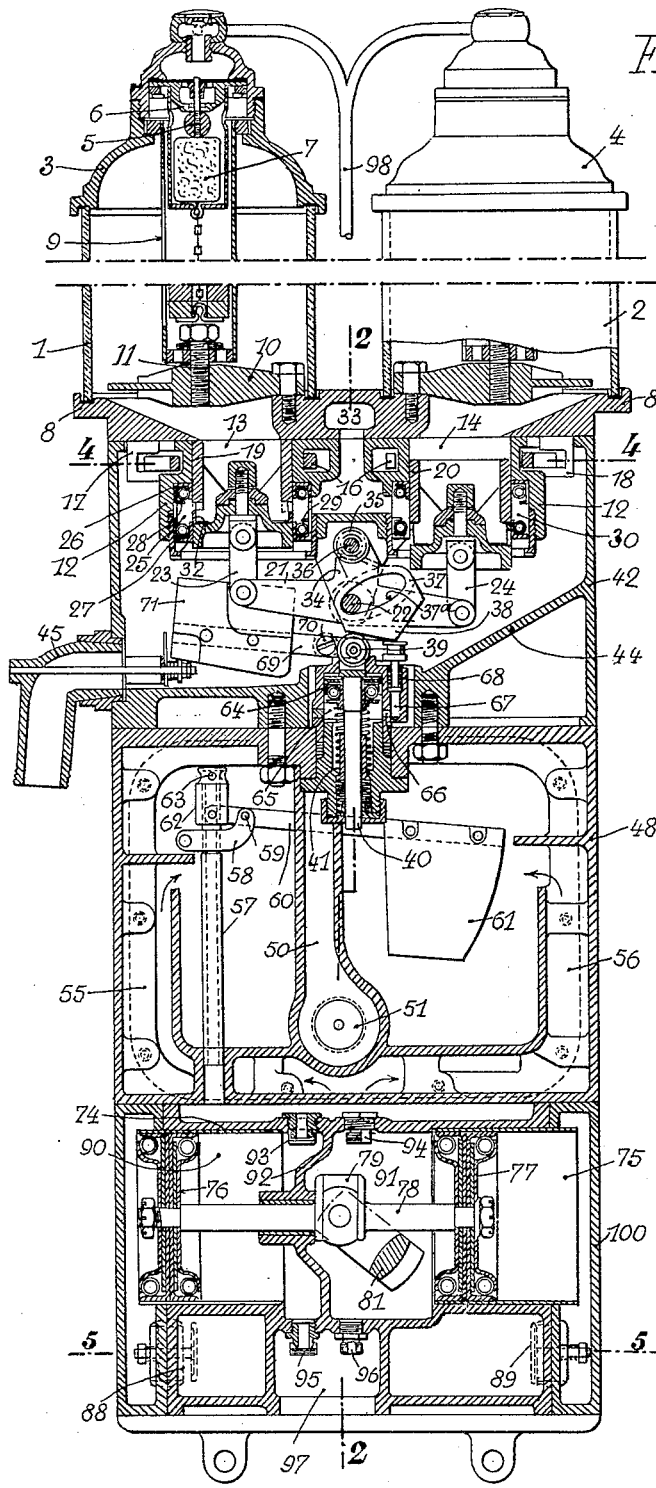
Fig. 1 is a vertical section of an apparatus according to the invention, on the line 1—1 of Fig. 2.

The apparatus for the supply of liquids as herein represented comprises in the usual manner two vessels of standard capacity 1 and 2, which will be designated as measuring vessels in the description. The said vessels are closed at the top by caps 3—4. In the cap 3 is a clack valve 5 which may be applied upon its seat 6 by a float 7. The cap 4 contains identical parts which are not shown in the drawings.

The measuring vessels 1—2 rest upon a base plate 8. The vessel 1 is secured to said plate by a central tube 9 which is fixed at its upper part to the cap 3 and at its lower part to a spider 10, bolted to said plate 8. A bolt 11 is screwed into the spider 10 for this purpose. A tube and spider of like construction serve to secure the vessel 2 to the base plate 8.

A member 12 is tightly fitted below the base plate 8 and it has two cylindrical bores whereof one 13 is situated below the vessel 1 and the other 14, below the vessel 2. The member 12 can be secured to the base plate 8 in the following manner. A bolt 15 (Figs. 2 and 4) is screwed into the base plate 8 and urges towards the latter the ends of two collars 16, each of which surrounds one of the bores 13—14 of the member 12.

The left-hand collar surrounding the bore 13, is engaged in a staple 17 (Fig. 1) mounted on the base plate 8. The right-hand collar surrounding the bore 14 is engaged in a staple 18 mounted on said base plate. It is observed that the bolt will thus apply the member 12 against the base plate 8, and the collars 16 act as levers of the second class.

In the bore 13 is slidable a piston 19, and in the bore 14 is slidable a piston 20, which pistons are connected by respective disks 23—24 to a rocking lever 21 which is pivoted at 22.

In the member 12 is an annular chamber 25 containing two elastic packing members 26—27 having an L-section, and these are held against the walls of the piston 19 by springs 28 and 29. Around the piston 20 is an annular chamber 30 containing packing members and springs in like arrangement.

The piston 19 comprises an annular aperture 31, whose height is approximately equal to the vertical stroke of the piston, and in said aperture is slidable by easy friction a ring 32 whose outer diameter is exactly equal to that of the piston 19, so that the said ring continues the external surface of the piston 19. The height of the ring 32 is about equal to one-half the height of the aperture 31. The piston 20 also comprises an aperture and a ring having an identical arrangement.

The chambers 25—30 communicate freely with a conduit 33 formed in the base plate 8 and serving for the admission of the liquid supplied by the pump, as will be further specified.

The rocking lever 21 connecting the two pistons is provided with an appendage 34 having the form of a toothed sector and engaging a pinion which is formed on a shaft 36. A lever 37 apertured at $37^a$ for the insertion of the axle 22 is keyed to the shaft 36 and at its lower end is disposed a cam 38; at each oscillation of the lever 37, the said cam drives back a roller 39 mounted on a push-piece 40, against a spring 41 which urges the said push-piece upwardly.

The push-piece 40 carries a piston 64, preferably provided with elastic packing, which is slidable in a cylinder 65, pierced with an aperture 66 controlled by a needle valve 67 under the action of a spring 68. A lever 69 pivoted at 70 and provided with a float 71 is connected to the needle valve in such manner that the said valve will open when the float descends and will close when the float rises.

The device consisting of the member 12, the pistons 19—20, the rocking arm 21 and its accessories, form a combination which can be removed and replaced by unscrewing the single bolt 15, without otherwise interfering with the apparatus. The said device is contained in a case 42 provided with a cover 43 and serving to contain the liquid expelled from the said measuring vessels by the pistons 19—20. The bottom of said case is inclined in order that the liquid will flow towards the outlet 45. For this reason, the case 42 will be designated as the discharge case.

The said discharge case, which has preferably a rectangular external form, comprises a conduit 46 (Fig. 2) in line with the conduit 33 of the base plate 8; at its lower end is a clock valve 47 preventing the return of the liquid towards the pump in the case of a defective operation of the pump valves.

The said discharge case rests upon and is secured to another case 48, preferably of rectangular form, which is divided into two parts $48^a$—$48^b$ by a vertical partition 49 (Fig. 2); herein a conduit 50 is in line with the conduit 46 of the discharge case 42, and it leads to a valve 51 urged on its seat by a spring 52. A push-piece 53 is adapted to open the said valve, as will be further specified. The conduit 50 is situated in the rear chamber $48^a$ of the case 48, and is connected therewith only by the valve 51.

The rear chamber $48^a$ communicates freely with the discharge conduit 54 of the pump by two conduits 55—56 (Figs. 1 and 3) formed along its inner walls and having abrupt changes of direction furthering the separation of the air from the liquid by the action of centrifugal inertia and by compression and expansion caused by such changes of direction. In the said rear chamber $48^a$ is disposed a tube 57 to which is secured a collar 58 carrying a journal 59 to which is pivoted a lever 60 provided with a float 61 at its outer end. The other end of the lever 60 is connected to a cap 62 mounted on the end of the tubes 57 and freely slidable on the same. Apertures 63 are formed at the upper part of said cap 62 near its closed end, which closes the upper end of the tube 57 when the said cap is lowered.

The front chamber $48^b$ of the case 48 is closed by the meter device 72, known per se, which may be of a type operating by the preliminary recording of the desired quantity by pushing in a button 73, and this movement opens the valve 51 by means of a push-rod 53.

Below the case 48 is the pump supplying the apparatus, which is contained in a main frame 100 of rectangular shape. Said pump comprises two horizontal coaxial cylinders 74—75 cooperating with respective pistons 76—77 mounted on a common piston rod 78 carrying a guide 79 in which is movable a slider 80. A crank controls the said slider by means of a crank pin 82, said crank being actuated by a handle 83 at the outside of the apparatus.

Below the cylinders 74—75 is provided a chamber 84 (Figs. 2 and 5) which opens to the exterior by an orifice 85 to which the suction tube is coupled.

A valve 86 opens from the chamber 84 towards the piston 76 and a valve 87 opens from said chamber towards the piston 77. A valve 88 opens from the piston 76 towards the discharge conduit 54, and a valve 89 opens from the piston 77 to the said conduit 54.

It is observed that the two pistons operate by their outer face, in cooperation with the suction valves 86—87 and the delivery valves 88—89, in order to withdraw the liquid from the pipe connected with the orifice 85 and to discharge it through the conduit 54, the valve 51 and the conduit 50, to the feeding device and the measuring vessels.

The space between the inner faces of the pistons 76—77 is divided into two chambers 90—91 by a partition 92 through which is slidable the piston rod 78. Two suction valves 93—94 open into the respective chambers 90 and 91; said valves open downwardly, and they communicate with the front chamber 48$^b$ of the case 48 which also communicates (Fig. 1) with the tube 57 evacuating the air charged with the vapour of the liquid.

Two discharge valves 95 and 96 open into the respective chambers 90 and 91; said valves open downwardly, and both communicate with a closed chamber 97 which is connected by a pipe 98 with the top of the two measuring vessels 1—2, and for this purpose the said pipe comprises two branches, each leading to a vessel.

By means of their two internal faces operating in the chambers 90—91, the two pistons 76—77 form a single-acting air pump, thus withdrawing air from the front chamber 48$^b$ of the case 48 and discharging it through the chamber 97 and the pipe 98 to the top of the measuring vessels 1—2.

The operation of the said apparatus is as follows.

The valve 51 is supposed to be open, since the valve rod 53 has been pushed back by pressing the button 73 of the meter 72. If the operator turns the pump handle 83, the pump discharges liquid through the conduit 54 and the conduits 55—56, into the rear chamber 48$^a$ of the case 48. The air escapes from this chamber through the tube 57, and passes through the apertures 63 of the said cap 62. When the level of the liquid attains the float 61, the latter rises and the cap 62 descends, thus closing the tube 57. The pressure thus increases in the rear chamber 48$^a$, and the liquid then circulates through the open valve 51 into the conduit 50, it lifts the valve 47 and flows through the conduits 46 and 33, also through the annular chamber 25 and the hollow interior of the piston 19, and thence into the measuring vessel 1 which is thus gradually filled.

During this time, the air driven forward by the rise of the liquid escapes through the orifice 6 and proceeds through the pipe 98 into the measuring vessel 2. At the same time, the air delivered by the pump into the pipe 98, as above explained, is added to the air expelled from the vessel 1 into the vessel 2. The liquid contained in the vessel 2 by reason of a previous operation will flow out through the hollow interior of the piston 20 and thus descends into the discharge case 42. Its outflow is much furthered by the action of the air which, as above stated, attains the top of the measuring vessel 2.

When the measuring vessel 1 is filled, the float 7 is thus raised and it closes the orifice 6 by lifting the valve 5. At this time, the vessel 1 is entirely closed, and when the pump is further operated it causes an increase of pressure in the measuring vessel, and thus the piston 19 is moved downwardly. The rocking lever 21 turns on its axle 22, and the piston 20 rises. During this time, the pinion 35 turns in the clockwise direction (Fig. 1) and the cam 38 is displaced to the left, thus driving down the roller 39 and attached piston 64 against the action of the spring 41 whose upward pressure had maintained the parts in position.

During this downward movement of the piston 19, the ring 32 has remained stationary, it being maintained by the pressure of the elastic packing 27. When the upper edge of the aperture 31 of the piston 19 makes contact with the ring 32, as shown in the dotted lines of Figure 1, the outer surface of the ring 32 and the surface of the piston 19 will form a continuous cylindrical surface without breach of continuity. The piston 19 and the ring 32 descend together, and the ring 32 clears the upper edge of the lower elastic packing member 27, then the main body of the piston 19 engages in said packing member, so that the upper edge of said packing member 27 will be at no time left in space. The piston 19 finally assumes a position which is the same as the one occupied by the piston 20 in Figure 1; inversely, the piston 20 has now mounted, and it has the position occupied by the piston 19 in Figure 1.

During this simultaneous displacement of the two pistons, the liquid in the measuring vessel 1 acts by its own weight upon the piston 19 in the direction which furthers its motion, and when the end of the cam 38 passes through the vertical position, the spring 41 ceases to oppose this motion. At this time, the two pistons 19—20 have a position in which all of the apertures are closed; the measuring vessel 1 no longer receives the pressure of the pump, but as above stated the weight of liquid therein will act upon the piston 19 in order to continue the movement. When the end of the cam 38 has slightly passed to the left of the vertical, the spring 41 expands and completes the motion.

The reversing movement being thus completed, the measuring vessel 1 delivers its liquid into the discharge chamber 42, whilst the measuring vessel 2 is connected with the conduit 33 through which it is supplied with the liquid delivered by the pump.

After the commencement of the reversing movement, the cam 38 causes the descent of the piston 64 in the cylinder 65. However, the said cylinder is constantly filled with the liquid which enters through the orifice 66 when the discharge case 42 is supplied with liquid from either of the measuring vessels.

When the measuring vessel 1 is entirely filled, if the vessel 2 is not entirely emptied at this time, a certain amount of liquid remains in the case 42; the float 71 thus rises, and the lever 69 brings the needle valve 67 upon its seat, thus closing the orifice 66. Since the liquid in the cylinder 65 is practically incompressible, the piston 64 will not descend and the whole mechanism is thus held in position until the discharge box 42 is entirely emptied.

The said arrangement, which prevents the reversal of the position of the feeding pistons as long as one of the measuring vessels which is being discharged is not entirely empty, thus assures the accurate functioning of the apparatus.

During the functioning, if air should leak into the suction piping of the pump, the pump will deliver to the conduit 54 a mixture of air and liquid which thus proceeds through the conduits 55—56 and enters the rear chamber 48ª of the case 48, and herein the air separates from the liquid and remains above the latter, and it thus lowers the level of the liquid; the float 61 descends and hence opens the tube 57 by raising its cap 62, and the air at once escapes through the lower end of the tube 57. The liquid vapour or drops thus entrained are at once withdrawn by the air pump which exercises suction through the valves 93—94. Obviously, the float 61 rises and thus closes the tube 57 by lowering the cap 62, as soon as the level rises in the rear chamber of the case 48.

As shown in Figures 1 to 2, the several parts of the apparatus consist of superposed rectangular cases 42—48—100, assembled by their flat edges which can be readily trimmed, and such cases can be easily mounted in position. The exterior of the apparatus will thus offer a smooth surface which can be readily cleaned and is of an attractive appearance. The said apparatus has no external piping for the liquid, as all such conduits are cast in one with the superposed cases.

Obviously, the said invention is not limited to the form of construction herein described and represented, which is given solely by way of example.

Having now described my invention what I claim as new and desire to secure by Letters Patent is:

1. In a liquid measuring and delivering apparatus of the type described which includes two measuring vessels, each having an outlet and an inlet opening, a liquid supplying conduit, means for forcing liquid into said supplying conduit, a liquid delivering conduit and control means responsive to an increase in the pressure of the supplied liquid arising upon filling up of a vessel to alternately connect the outlet of the filled vessel with the liquid delivering conduit and the inlet of the other vessel with the liquid supplying conduit, control means forming an aggregated unit adapted to be put in place and removed as a whole, securing means for said removable aggregated unit comprising two lever-like members arranged to press said unit in place and a single clamp with a single bolt adapted to be screwed to a fixed portion of the apparatus to press both levers onto said unit, thereby securing the latter in place.

2. In a liquid measuring and delivering apparatus as claimed in claim 1, wherein said control means include two piston valves with circular cylinders, two lever-like members having each the shape of a ring, each of said rings loosely embraces one of said cylinders and is provided with diametrically-opposite projections, one of which may pivotally bear on a fixed part of the apparatus, both rings being so positioned that the other projections are close to one another, and clamping means adapted to simultaneously bear on both said latter named projections to apply the lever like members against said unit to press the latter in place.

3. In a liquid measuring and delivering apparatus as claimed in claim 1, wherein said control means include two piston valves with circular cylinders, two lever-like members having each the shape of a ring, each of said rings loosely embraces one of said cylinders and is provided with diametrically opposite projections, one of which may pivotally bear on a fixed part of the apparatus and with knife-like projections substantially contained in a diametrical plan perpendicular to the plane of the ring, said knife-like projections being adapted to pivotally engage said unit, both rings being so positioned that the other projections are close one another, and clamping means adapted to simultaneously bear on both said latter named projections to apply the lever like members against said unit to press the latter in place.

In testimony whereof I have signed my name to this specification.

HENRI BOUTILLON.